US007752165B2

(12) United States Patent
Ireland et al.

(10) Patent No.: US 7,752,165 B2
(45) Date of Patent: Jul. 6, 2010

(54) PERSISTENT QUERY SYSTEM FOR AUTOMATIC ON-DEMAND DATA SUBSCRIPTIONS FROM MOBILE DEVICES

(75) Inventors: Evan Ireland, Wellington (NZ); Kyle Leckie, Ontario (CA); David Clegg, Altadena, CA (US)

(73) Assignee: Sybase, Inc., Dublin, CA (US)

( * ) Notice: Subject to any disclaimer, the term of this patent is extended or adjusted under 35 U.S.C. 154(b) by 336 days.

(21) Appl. No.: 11/882,447

(22) Filed: Aug. 1, 2007

(65) Prior Publication Data
US 2009/0037395 A1 Feb. 5, 2009

(51) Int. Cl.
*G06F 17/30* (2006.01)
(52) U.S. Cl. .................. 707/609; 707/610; 707/620; 707/621; 707/626; 707/629; 707/632; 709/248
(58) Field of Classification Search .......... 707/3, 707/10, 104.1, 609, 610, 617, 618, 619, 620, 707/621, 626, 628, 632
See application file for complete search history.

(56) References Cited

U.S. PATENT DOCUMENTS

| 6,539,381 | B1 |  | 3/2003 | Prasad et al. |  |
|---|---|---|---|---|---|
| 6,567,864 | B1 | * | 5/2003 | Klein | 710/10 |
| 6,636,873 | B1 |  | 10/2003 | Carini et al. |  |
| 6,636,886 | B1 | * | 10/2003 | Katiyar et al. | 709/203 |
| 6,769,032 | B1 | * | 7/2004 | Katiyar et al. | 709/246 |
| 7,127,467 | B2 | * | 10/2006 | Yalamanchi et al. | 707/102 |
| 7,177,859 | B2 | * | 2/2007 | Pather et al. | 707/3 |
| 7,266,826 | B2 | * | 9/2007 | Katiyar et al. | 719/316 |
| 7,360,202 | B1 | * | 4/2008 | Seshadri et al. | 717/106 |
| 7,444,344 | B2 | * | 10/2008 | Galindo-Legaria et al. | 707/101 |
| 7,487,186 | B2 | * | 2/2009 | Shimshoni | 707/201 |
| 7,509,304 | B1 | * | 3/2009 | Pather et al. | 707/3 |
| 2003/0061365 | A1 | * | 3/2003 | White et al. | 709/229 |
| 2003/0131073 | A1 | * | 7/2003 | Lucovsky et al. | 709/219 |
| 2003/0212670 | A1 | * | 11/2003 | Yalamanchi et al. | 707/3 |
| 2004/0002972 | A1 | * | 1/2004 | Pather et al. | 707/6 |
| 2004/0002988 | A1 | * | 1/2004 | Seshadri et al. | 707/102 |
| 2004/0158577 | A1 |  | 8/2004 | Chu et al. |  |
| 2004/0193608 | A1 | * | 9/2004 | Gollapudi et al. | 707/10 |
| 2005/0182773 | A1 |  | 8/2005 | Feinsmith |  |
| 2007/0156656 | A1 | * | 7/2007 | Pather et al. | 707/3 |

OTHER PUBLICATIONS

Notification of Transmittal of the International Search Report and Written Opinion, dated Sep. 25, 2008, for PCT Application No. PCT/US08/07175, 10 pages.
Leff et al., "Programming Model Alternatives for Disconnected Business Applications," IEEE Computer Society (IEEE Internet Computing), May-Jun. 2006; pp. 50-57.
Ireland., U.S. Appl. No. 11/882,448, filed Aug. 1, 2007, entitled "Programming System for Occasionally-Connected Mobile Business Applications".

* cited by examiner

*Primary Examiner*—Jean M Corrielus
(74) *Attorney, Agent, or Firm*—Sterne, Kessler, Goldstein & Fox PLLC

(57) ABSTRACT

A system, method, and computer program product are provided for creating a data subscription to a remote database. Additionally, a system, method, and computer program product are provided for creating a persistent query, wherein a table in a remote database is represented by a meta-data definition.

26 Claims, 14 Drawing Sheets

PERSISTENT QUERY SYSTEM FOR AUTOMATIC ON-DEMAND DATA SUBSCRIPTIONS FROM MOBILE DEVICES

CROSS-REFERENCE TO RELATED APPLICATIONS

The present application is related to U.S. patent application Ser. No. 11/882,448, titled "Programming System for Occasionally-Connected Mobile Business Applications," filed Aug. 1, 2007, herein incorporated by reference in its entirety.

BACKGROUND OF INVENTION

1. Field of the Invention

The present invention relates generally to databases and, more particularly, to synchronizing a remote database with a local database.

2. Description of the Background Art

Mobile devices are in common usage, many featuring powerful processors, larger and more colorful displays, and wireless networking capabilities. Despite these advances in mobile technology, mobile devices typically have greater limitations on memory capacity and networkability than workstation computers. Given the versatility of mobile devices, it is helpful to implement a means by which these mobile devices can interact with data sets larger than any it could manage on its own, and doing so in the context of potentially intermittent, unreliable, or unavailable networking capabilities.

Interaction using data sets exchanged between mobile devices and central servers often occurs in the context of exchanges of information stored in databases. Mobile devices often retain a copy of some or all of the data found in the central database in a local database for local access. However, inefficiencies abound given the limitations of mobile devices. Accordingly, what is desired is a means of efficiently synchronizing a local database with a central database.

SUMMARY OF INVENTION

The invention includes a method for creating a data subscription to a remote database. The method includes the steps of creating a meta-data definition of a table, the table located within the remote database, marking a query to be performed on the table, within the definition, as persistent, and generating a persistent query entity based on the definition, wherein the persistent query entity is mapped to a persistent query table in a local database.

The invention also includes a computer program product comprising a computer usable medium having computer program logic recorded thereon for enabling a processor to create a data subscription to a remote database. The computer program logic includes a creating means for enabling a processor to create a meta-data definition of a table, the table located within the remote database, a marking means for enabling a processor to mark a query to be performed on the table, within the definition, as persistent, and a generating means for enabling a processor to generate a persistent query entity based on the definition, wherein the persistent query entity is mapped to a persistent query table in a local database.

The invention additionally includes a system capable of creating a data subscription to a remote database. The system includes a first module to create a meta-data definition of a table, the table located within the remote database, a second module to mark a query to be performed on the table, within the definition, as persistent, and a third module to generate a persistent query entity based on the definition, wherein the persistent query entity is mapped to a persistent query table in a local database.

The invention furthermore includes a computer-implemented method for creating a persistent query, wherein a table in a remote database is represented by a meta-data definition. The method includes the steps of identifying, in the definition, a query to be performed on the table, wherein the query has been marked as a subscribed query, defining a persistent query entity for the subscribed query, mapping the persistent query entity to a persistent query table, and generating query code, the query code operable to perform the query on a local database.

Moreover, the invention includes a computer program product comprising a computer usable medium having computer program logic recorded thereon for enabling a processor to create a persistent query, wherein a table in a remote database is represented by a meta-data definition. The computer program logic includes an identifying means for enabling a processor to identify, in the definition, a query to be performed on the table, wherein the query has been marked as a subscribed query, a defining means for enabling a processor to define a persistent query entity for the subscribed query, a mapping means for enabling a processor to map the persistent query entity to a persistent query table, and a generating means for enabling a processor to generate query code, the query code operable to perform the query on a local database.

Also included in the invention is a system capable of creating a persistent query, wherein a table in a remote database is represented by a meta-data definition. The system includes a first module to identify, in the definition, a query to be performed on the table, wherein the query has been marked as a subscribed query, a second module to define a persistent query entity for the subscribed query, a third module to map the persistent query entity to a persistent query table, and a fourth module to generate query code, the query code operable to perform the query on a local database.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the relevant art to make and use the invention.

Figure 1:
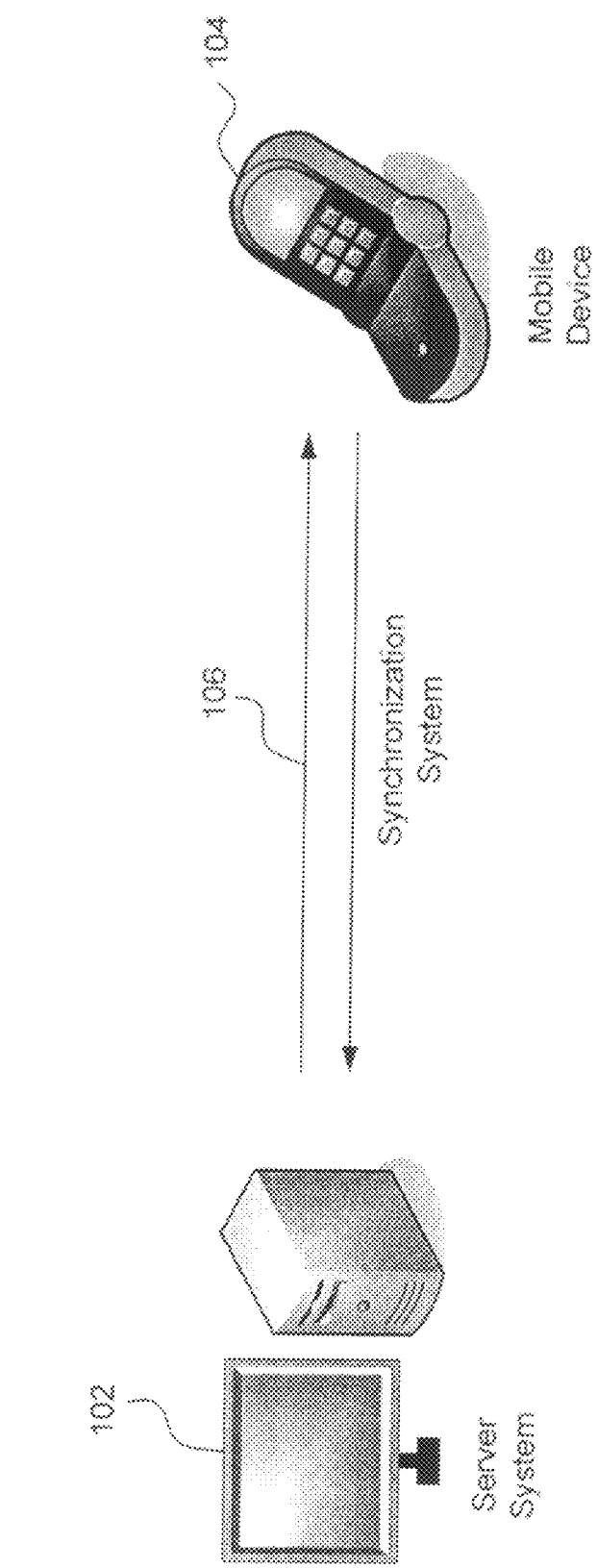
FIG. 1 illustrates a mobile data system, in accordance with an embodiment of the present invention.

The present invention will now be described with reference to the accompanying drawings. In the drawings, generally, like reference numbers indicate identical or functionally similar elements. Additionally, generally, the left-most digit (s) of a reference number identifies the drawing in which the reference number first appears.

DETAILED DESCRIPTION

I. Introduction

FIG. 1 depicts a mobile system 100 which allows a mobile device 104 to synchronize with a server system 102 over a synchronization system 106, in accordance with an embodiment of the present invention. Synchronization allows mobile device 104 to receive the most current data available on server system 102, as well as upload its most currently available data to the server system 102, for any given application or set of applications. For example, a calendar application might allow other users to add or make changes to appointments which are then stored on server system 102. A user of mobile device 104 may also have added or made changes to appointments within the mobile device 104 itself. Upon synchronization, the server system 102 learns of the appointments made on mobile device 104, and mobile device 104 learns of appointments made on server system 102. In accordance with an additional embodiment of the present invention, a partial synchronization is possible, whereby some subset of appointments would be exchanged. "Data" as used herein may be any object, including, but not limited to, information in any form (text, video, audio, etc.) and applications.

Synchronization system 106 is commonly a persistent network connection over a cellular provider network, and communications travel over the Internet. However, synchronization system 106 may be any communication means by which server system 102 and mobile device 104 may interact, such as a docking cradle, Wide Area Network (WAN), Local Area Network (LAN), Wireless Local Area Network (WLAN), infrared, or Bluetooth. The degree of availability of access to the communication means employed may vary greatly, and a user of mobile device 104 may go for days without synchronizing by using a docking cradle, or may be able to synchronize constantly when connected to a WAN.

Figure 2:
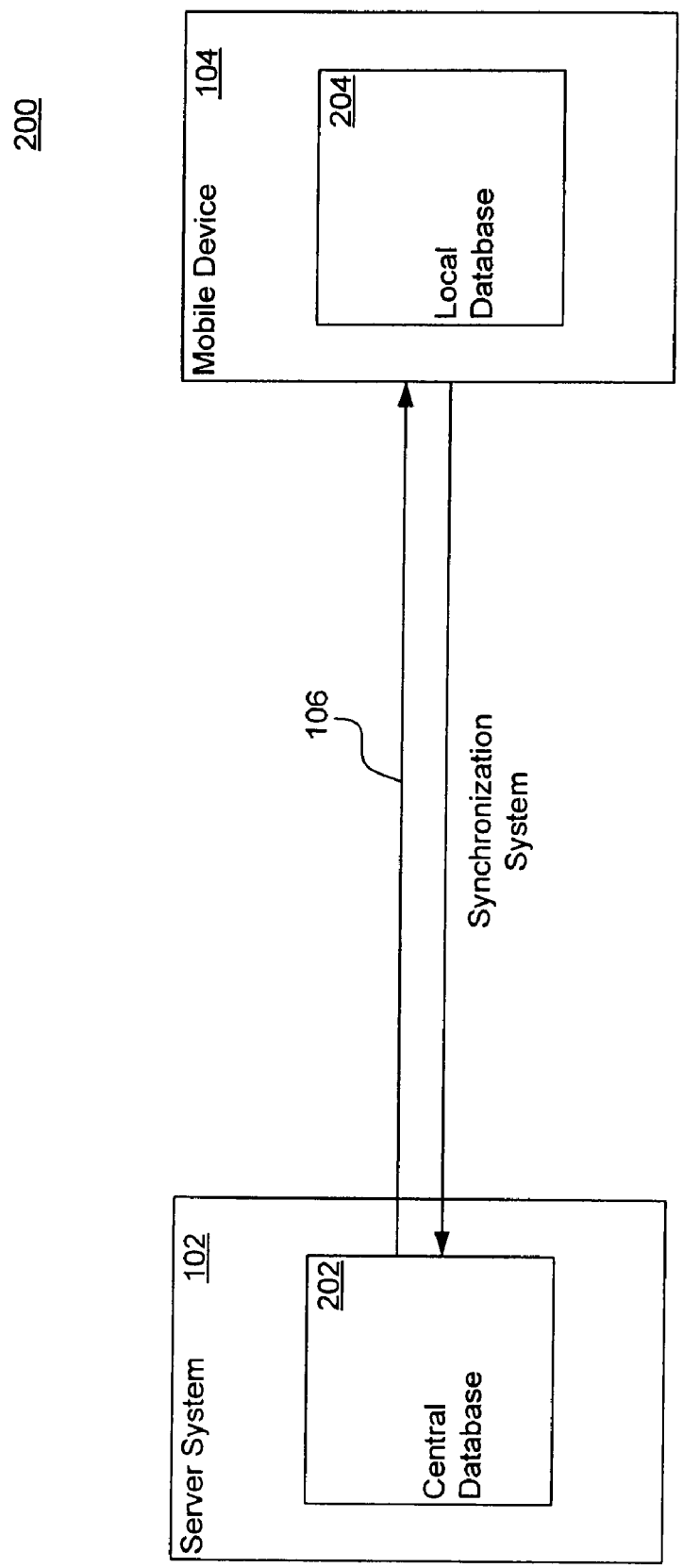
FIG. 2 illustrates a modular view of a mobile data system, in accordance with an embodiment of the present invention.

FIG. 2 depicts a mobile system 200 in which mobile device 104 is capable of synchronizing with server system 102 over synchronization system 106, in accordance with an embodiment of the present invention. Synchronization system 106 is operable to synchronize a central database 202 located at server system 102 with a local database 204 located at mobile device 104.

In a typical system, multiple mobile devices synchronize with a central server system. The central server system need not be a single physical computer, and may in fact comprise several computers distributed over a number of physical and network locations. For the purposes of illustration, a server system 102 is depicted as a single point of access for synchronization system 106.

Figure 3:
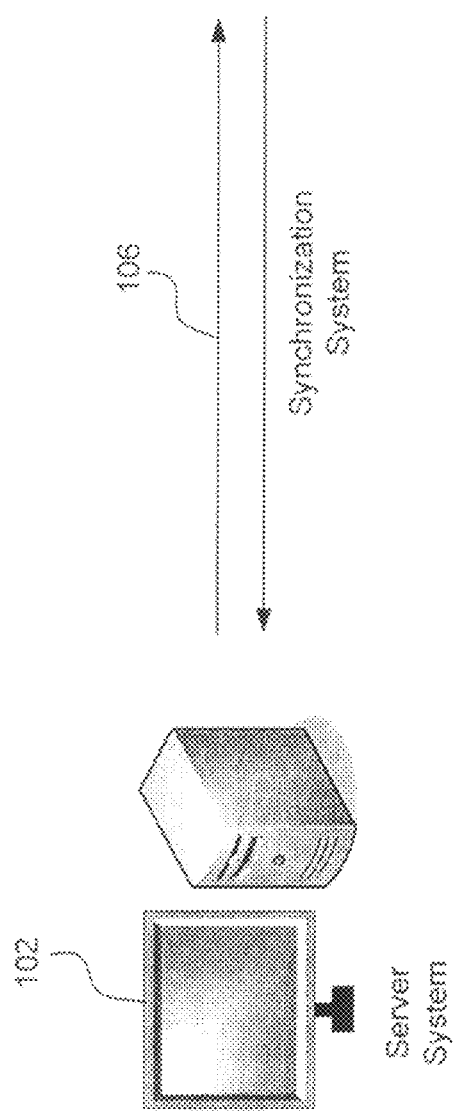
FIG. 3 illustrates a multi-user implementation of a mobile data system, in accordance with an embodiment of the present invention.
Figure 3:
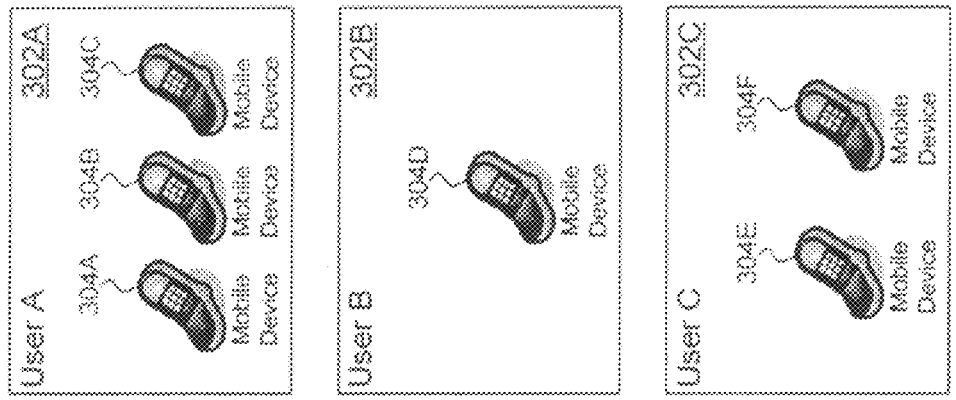

FIG. 3 depicts a mobile system 300 in which multiple mobile devices 304A-304F are operable to synchronize with server system 102 over synchronization system 106, in accordance with an embodiment of the present invention. Each of the mobile devices 304A-304F is associated with a user, such as User A 302A, User B 302B, or User C 302C. For example, User A 302A has three mobile devices assigned to the user account, namely mobile devices 304A-304C. This implementation allows each user the ability to select different synchronization options that affect how synchronization is performed.

II. Creating a Data Subscription

With continued reference to FIG. 2, as previously noted mobile device 104 is unable to replicate every piece of data contained in central database 202 within server system 102 in its own local database 204. Mobile device 104 may also be unable to constantly query central database 202 in order to obtain the most current data. By creating a data subscription, mobile device 104 can attempt to retrieve relevant data from central database 202 into local database 204 in order to resolve future queries locally.

Figure 4:
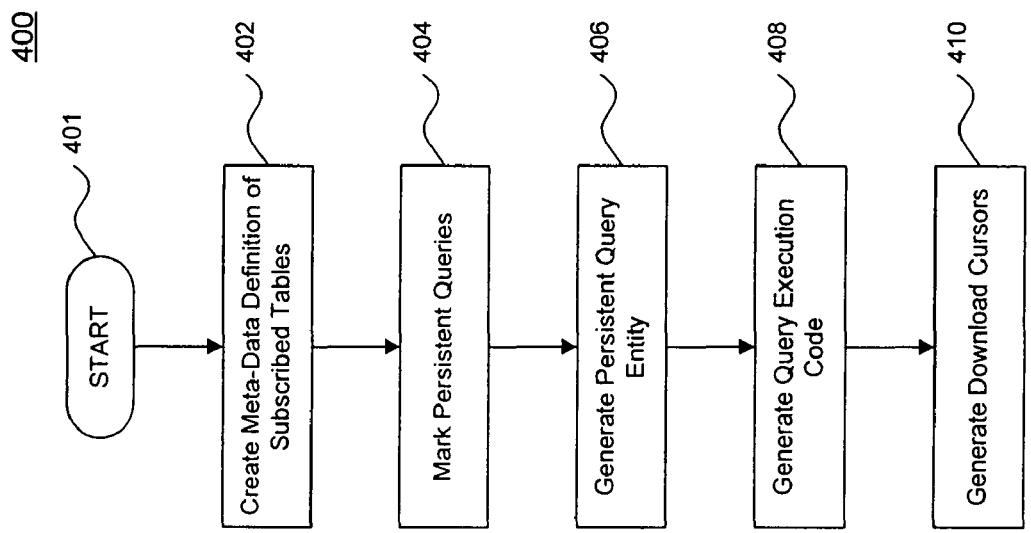
FIG. 4 is a flowchart illustrating steps by which a data subscription is defined, in accordance with an embodiment of the present invention.

FIG. 4 is a flowchart 400 illustrating steps by which a data subscription can be created, in accordance with an embodiment of the present invention. Starting at step 401, the method proceeds to step 402 where a meta-data definition of subscribed tables is created. At step 404, queries to those tables that should be persistent are marked, and a persistent query entity is generated at step 406 for the marked queries. At step 408, code for executing a query is generated, and download cursors are generated at step 410. Each of these steps is explained further with reference to FIG. 2. In accordance with an embodiment of the present invention, these steps are performed within mobile device 104.

Central database 202 comprises some number of data tables, in which data is stored in rows, in accordance with an embodiment of the present invention. One skilled in the relevant arts will appreciate that data in a database may be stored in other data structures, and this configuration is used only for purposes of illustration, and not by way of limitation. Local database 204 stores some subset of the tables from central database 202, and, within each table, some subset of its rows. Either subset may be the complete set of tables or rows from the central database 202, but in a typical implementation fewer than all tables will be present in the local database, and possibly fewer than all rows will be present in each table in the local database.

In order to obtain a copy of tables and rows from central database 202 in local database 204, those tables which hold data that may be accessed by mobile device 104 are described through the use of a meta-data definition in step 402. For example, a table of "customers" where each customer is associated with a unique customer ID, the customer's name, and the customer's address, is described with the following meta-data definition in accordance with an embodiment of the present invention:

```
<entity name="Customer" table="customer_t" id="id">
   <attribute name="id" column="c_id" type="int" />
   <attribute name="name" column="c_name" type="string" />
   <attribute name="address" column="c_address" type="string" />
   <query name="findByName" type="Customer*">
      <parameter name="name" type="string" />
      <sql>
         select  c_id,  c_name,  c_address
            into  :id,  :name,  :address
            from customer_t
            where c_name = :name
      </sql>
   </query>
</entity>
```

It is noted that code examples provided herein are presented solely for purposes of illustration and not limitation. The invention includes any implementation that achieves the functionality described herein.

In this example, the "customer_t" table located in central database 202 has been associated with the meta-data definition of the entity "Customer," and each of the columns within table "customer_t" has been associated with an attribute. Furthermore, a query "findByName" which can be performed on the "customer_t" table is explicitly defined, in accordance with an embodiment of the present invention. Since the customer's name is not necessarily a unique identifier, the return type for the query is an array of "Customer" entities.

In accordance with an embodiment of the present invention, a meta-data definition of a table includes an implicit query. An implicit query, unlike the explicitly defined "findByName" query in the above example, is defined by an application executing on mobile device 104. For example, a "find" query, which returns results in "customer_t" which match the primary key (the customer ID) can be readily implemented by the system. One skilled in the relevant arts will appreciate that the example meta-data schema used here is shown by way of example, and not limitation.

At step 404, any queries that should be regarded as persistent are marked as such. In accordance with an embodiment of the present invention, marking persistent queries is accomplished with a <subscribe-on-demand> tag. This tag is placed within a <query> tag in order to indicate that the query should be regarded as persistent. In accordance with an embodiment of the present invention, if the <subscribe-on-demand> tag is placed within the <entity> tag, then any implicit query should be regarded as persistent.

At step 406, a persistent query entity is generated for any marked persistent queries, in accordance with an embodiment of the present invention. This is done for both explicit and implicit queries. As before, entities are associated with a table, and the persistent query entities are mapped to a persistent query table. The process of generating a persistent query is described further in Section III, with reference to FIG. 5.

At step 408, code is generated which enables an application running on mobile device 104 to execute the subscribed queries, in accordance with an embodiment of the present invention. The code first consults the persistent query table, created by the mapping of a persistent query entity, for the particular query to be executed. If a row is found for the query within the persistent query table, then this means that the query has been previously performed on the mobile device 104, and the result is held in local database 204. The query is then performed against local database 204. If a row is not found for the query, then it is created.

Finally, download cursors are generated at step 410 in order to retrieve data needed for a subscribed query from the central database 202. The process of generating a download cursor is described further in Section IV, with reference to FIG. 6.

III. Generating a Persistent Query

Figure 5:
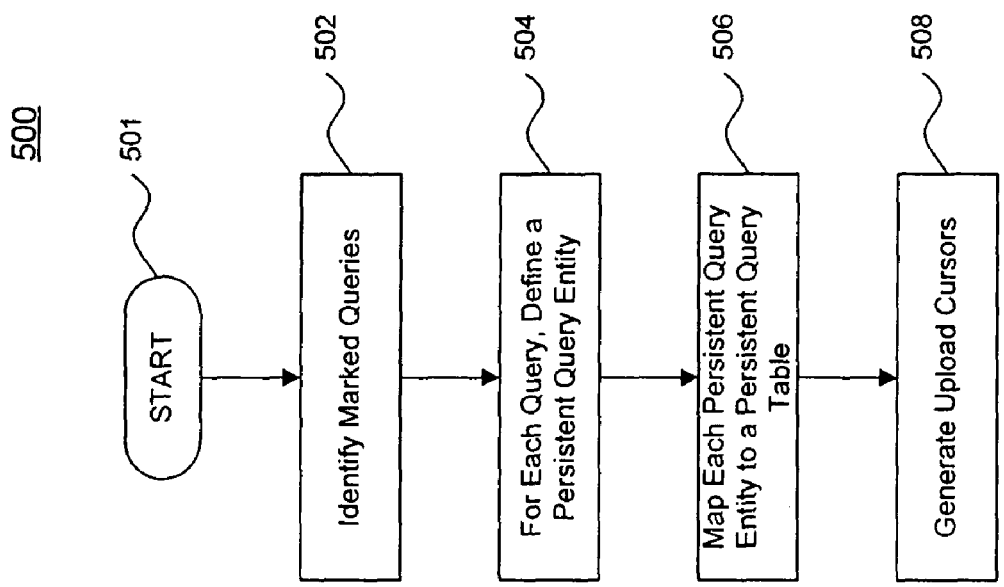
FIG. 5 is a flowchart illustrating steps by which a data subscription is recognized, in accordance with an embodiment of the present invention.

The steps by which a persistent query is generated are detailed in flowchart 500 in FIG. 5. Starting at step 501, the method proceeds to step 502 where marked queries are identified. In accordance with an embodiment of the present invention, marked queries are those that have been tagged with a <subscribe-on-demand> tag, whether the query is explicitly defined or implicitly defined.

At step 504 a persistent query entity is defined for each query tagged with a <subscribe-on-demand> tag. In accordance with an embodiment of the present invention, a persistent query entity for the example "findByName" query shown in Section II would be the following:

```
<entity name="Customer_findByName_pq"
   id-class="Customer_findByName_pq_id">
   <attribute name="userId" type="string" />
   <attribute name="remoteId" type="string" />
   <attribute name="nameParam" type="string" />
   <attribute name="lastModified" type="dateTime" />
</entity>
```

In the example persistent query entity, the "Customer_findByName_pq_id" id-class is a composite key class.

At step 506, the persistent query entity is mapped to a persistent query table. In accordance with an embodiment of the present invention, the persistent query table has columns corresponding to the attributes associated with the persistent query entity, such as "userid" and "nameParam" in the above example.

With the mapping between this entity and a persistent query table, each row in the table represents the fact that the mobile device 104 has (at least once) invoked the query with particular parameters. For example, if the client has invoked Customer.findByName("Bob"), then a row will exist in the table for Customer_findByName_pq where the nameParam attribute is equal to "Bob." In accordance with an embodiment of the present invention, the userId and remoteId attributes are unique identifiers for the client user and mobile device, respectively.

In accordance with an embodiment of the present invention, when a persistent query entity is generated, an upload cursor is also generated at step 508. An upload cursor enables any new rows in the persistent query table (such as when a query is first made in the mobile device 104) to be uploaded to the central database 202 during the next synchronization event.

In accordance with an additional embodiment of the present invention, the lastModified attribute is set to the time and date at which a new subscription, represented by rows in the persistent query table, arrives at the central database 202. This is accomplished, in accordance with an embodiment of the present invention, through the use of insert triggers at the server system 102. An insert trigger determines when a new row from the persistent query table arrives at the central database 202 and sets the lastModified time to the current time.

IV. Generating a Download Cursor

Figure 6:
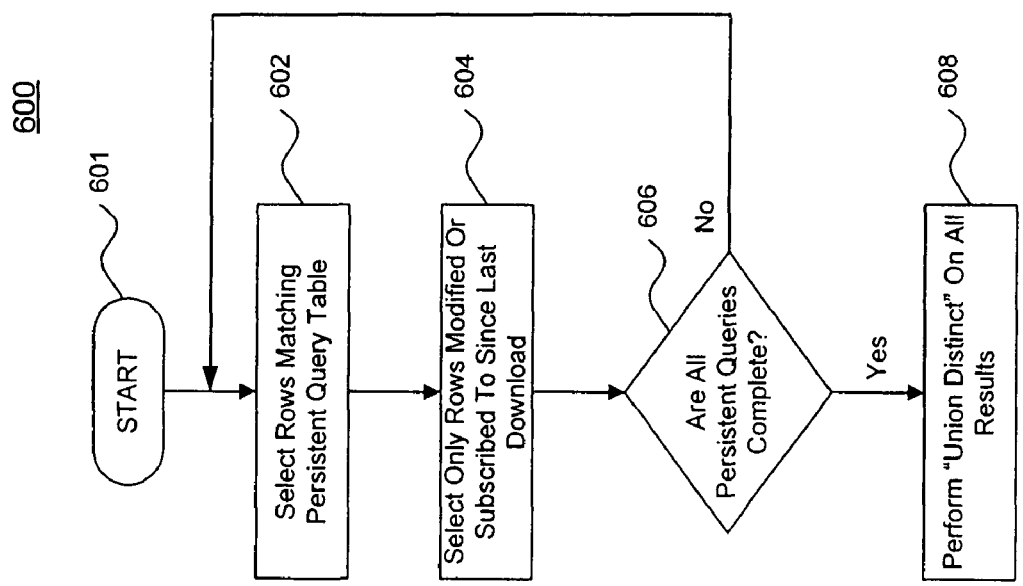
FIG. 6 is a flowchart illustrating steps by which data is accessed by a mobile device, in accordance with an embodiment of the present invention.

FIG. 6 is a flowchart 600 illustrating the steps by which a download cursor is generated in order to retrieve data into a local database 204 from a central database 202, in accordance with an embodiment of the present invention. The method starts at step 601 and proceeds to step 602 where rows are selected which match the persistent query table. At step 604, only those rows which have been modified or subscribed to since the last download (i.e., synchronization) are selected. In accordance with an embodiment of the present invention, by performing steps 602 and 604, a query is generated which joins the persistent query table associated with the query to a data table containing the result rows for the query. The generated download cursor for the "findByName" query shown in Section II is generated through steps 602 and 604, in accordance with an embodiment of the present invention, as follows:

```
select c.c_id, c.c_name, c.c_address
    from customer_t c, customer_t_findbyname_pq pq
    where pq.remote_id = {ml s.remote_id}
    and pq.name_param = c.c_name
    and (c.last_modified >= {ml s.last_table_download}
        or pq.last_modified >= {ml s.last_table_download})
```

In this example, only those rows from the "customer_t" table where the customer's name matches the name parameter in the persistent query table are selected, as in step 602. Furthermore, those rows are only selected if they have been modified since the last time they have been downloaded or the persistent query table has been modified since the last time they have been downloaded.

It should be noted that the example uses the convention "{ml . . . }" to denote access to the central database 202 rather than tables located in the local database 204. One skilled in the relevant arts will appreciate that additional methods may be used in order to access data directly from a table located on the central database 202, and the presented schema is shown as an illustration, not a limitation.

In accordance with an embodiment of the present invention, an additional check for each retrieved row is made to determine whether the rows retrieved from the central database 202 are associated with an ID for the mobile device 104. By including this check, multiple mobile devices such as mobile device 104, each with their own "remote_id" or equivalent identifying information, are able to access the system and retain their own persistent query information.

At step 606, a determination is made as to whether a query has been generated for each persistent query. If not, steps 602 and 604 are repeated for each additional persistent query. At step 608, the download cursor is completed by combining each of the queries such that they are executed as a group. In accordance with an embodiment of the present invention, this is accomplished by performing a "union distinct" operation between each query in order to ensure that selected data rows only appear once (and are therefore only retrieved and synchronized once) within the results to be stored in the local database 204. The possibility of duplicate rows exists if, for example, the above illustrated "findByName" query is executed together with the implicit "find" query in Section II, as Customer.find(200) and Customer.findByName("Bob") might return a duplicate entry if a customer named "Bob" also happens to have customer ID number 200. One skilled in the relevant arts will appreciate that other means for recognizing and eliminating duplicate entries may be used, and the use of the "union distinct" operation should not be considered limiting.

V. Deleting or Evicting Rows from the Local Database

Perhaps due to storage limits in local database 204 and mobile device 104, or perhaps because the data contained in a row in local database 204 is no longer needed, or for other reasons, it is occasionally necessary to delete a row from local database 204. A deletion, in the context of the present invention, takes on two forms: a complete deletion, which not only deletes the row from the local database 204, but also marks the row for deletion at the central database 202; and an "eviction," which merely deletes a row from local database 204 to free space, but does not disturb the equivalent row in central database 202.

Figure 7:
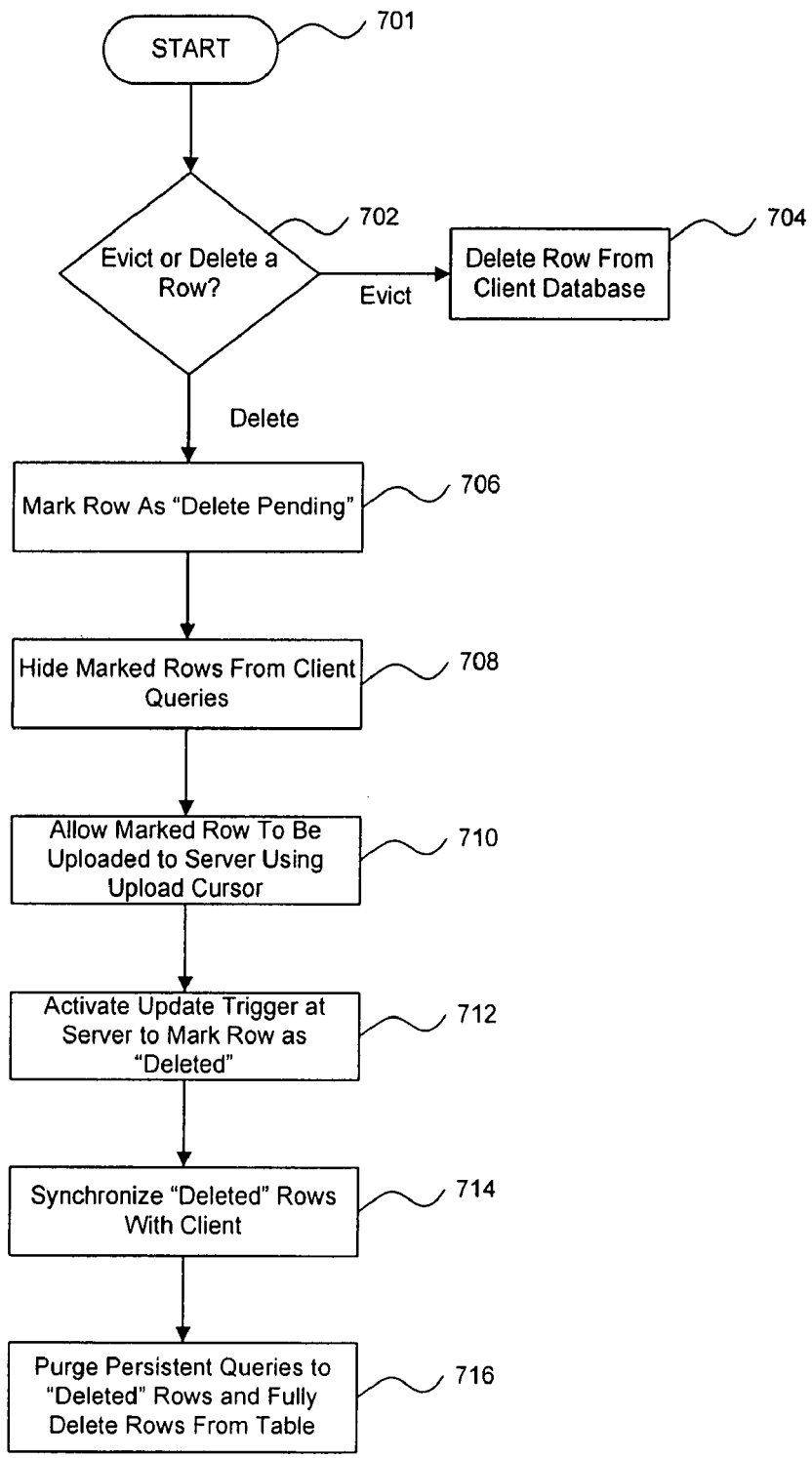
FIG. 7 is a flowchart illustrating steps by which a mobile device is able to evict or delete a row from a database, in accordance with an embodiment of the present invention.

FIG. 7 is a flowchart 700 which depicts the steps by which rows may be deleted or evicted from a local database 204 in mobile device 104. The method begins at step 701 and proceeds to step 702, where a decision is made as to whether the row is requested to be evicted or deleted (i.e., completely deleted from all databases). If the row is only to be evicted, then the method proceeds to step 704 where the row is deleted from the mobile device's local database 204, and no further work is necessary.

If the row is to be deleted, then the method proceeds to step 706, where a row is marked as "delete pending" in the local database 204, in accordance with an embodiment of the present invention. This is accomplished by, for example, setting a "deleted" column for the row as 'P' for "pending," though one skilled in the relevant arts will appreciate that other methods may be used to mark a row as pending for deletion.

At step 708, any queries to the local database where the row marked for deletion would otherwise be one of the result rows is hidden from the query results. In accordance with an embodiment of the present invention, this is accomplished by adding a condition such as a test for "deleted='N'" to all queries to ensure that any result rows are not marked for deletion.

At step 710, an upload cursor is allowed to send the marked row to central database 202 during the next synchronization operation. In accordance with an embodiment of the present invention, an additional condition is added to the upload cursor to check for any rows that meet the condition "deleted='P'", and uploads those rows accordingly.

At step 712, with the marked row received at server system 102 in central database 202, a trigger is activated which marks the row within central database 202 as deleted (e.g., "deleted='Y'"), in accordance with an embodiment of the present invention. One skilled in the relevant arts will recognize that other means by which the central database 202 can indicate to additional mobile devices that a row has been deleted may be utilized, and this example should not be considered limiting.

At step 714, rows marked as deleted at the central database 202 are synchronized back to the local database 204, in accordance with an embodiment of the present invention. This occurs not only at the client requesting the deletion, but on all clients requesting the deleted row from central database 202. It should be noted that when a row marked as deleted is synchronized with a client, the client will ignore the deleted row for the purposes of any queries made against its local database 204.

With the deleted rows synchronized to the local database 204, it is necessary to actually purge the row from the local database to complete the deletion process, as in step 716. In accordance with an embodiment of the present invention, this is accomplished by running a periodic check on the local database 204 to locate rows that have been marked as deleted and purging those rows from the database. Additionally, rows for persistent queries associated with the deleted row should be deleted. In accordance with an embodiment of the present invention, persistent query rows are deleted by scanning all persistent query rows to find any affected persistent queries, and deleting those rows.

In accordance with an additional embodiment of the present invention, central database 202 tracks what mobile devices are subscribed to a deleted row, and additionally which of those mobile devices have synchronized the deletion. When all of the mobile devices have synchronized this change, it is possible for the server system 102 to physically remove the deleted row from its central database 202.

VI. Deleting Rows from the Central Database

When a row is deleted from the central database, the process is handled much like with a client-originated deletion, as detailed in Section V, from the point at which the client-deleted row has been synchronized with the central database 202.

Figure 8:
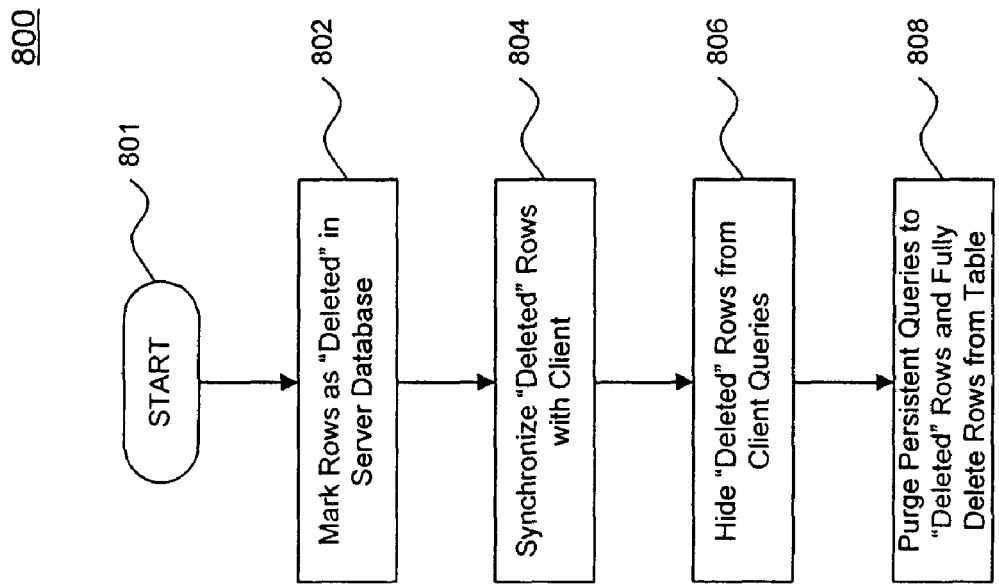
FIG. 8 is a flowchart illustrating steps by which a server is able to delete rows from a database, in accordance with an embodiment of the present invention.

FIG. 8 is a flowchart 800 illustrating the steps by which a row may be deleted at the central database 202. The method starts at step 801 and proceeds to step 802 where the row to be deleted is marked as deleted (e.g., "deleted='Y'") at the central database 202.

At step 804, rows marked as deleted at the central database 202 are synchronized to local database 204, in accordance with an embodiment of the present invention. This occurs on any clients requesting the deleted row from central database 202. It should be noted that when a row marked as deleted is synchronized with a client, the client will ignore the deleted row for the purposes of any queries made against its local database 204, as shown in step 806.

With the deleted rows synchronized to the local database 204, it is necessary to actually purge the row from the local database to complete the deletion process, as in step In accordance with an embodiment of the present invention, this is accomplished by running a periodic check on the local database 204 to locate rows that have been marked as deleted and purging those rows from the database. Additionally, rows for persistent queries associated with the deleted row should be deleted. In accordance with an embodiment of the present invention, persistent query rows are deleted by scanning all persistent query rows to find any affected persistent queries, and deleting those rows.

In accordance with an additional embodiment of the present invention, central database 202 tracks what mobile devices are subscribed to a deleted row, and additionally which of those mobile devices have synchronized the deletion. When all of the mobile devices have synchronized this change, it is possible for the server system 102 to physically remove the deleted row from its central database 202.

VII. Handling Entity Relationships

In creating a meta-data definition (i.e., entity) of a table, it is also possible to define a relationship between two such entities. In accordance with the present invention, this is accomplished by modeling an entity's attributes as having a data type which is another entity or a list (e.g., array) of other entities.

Figure 9:
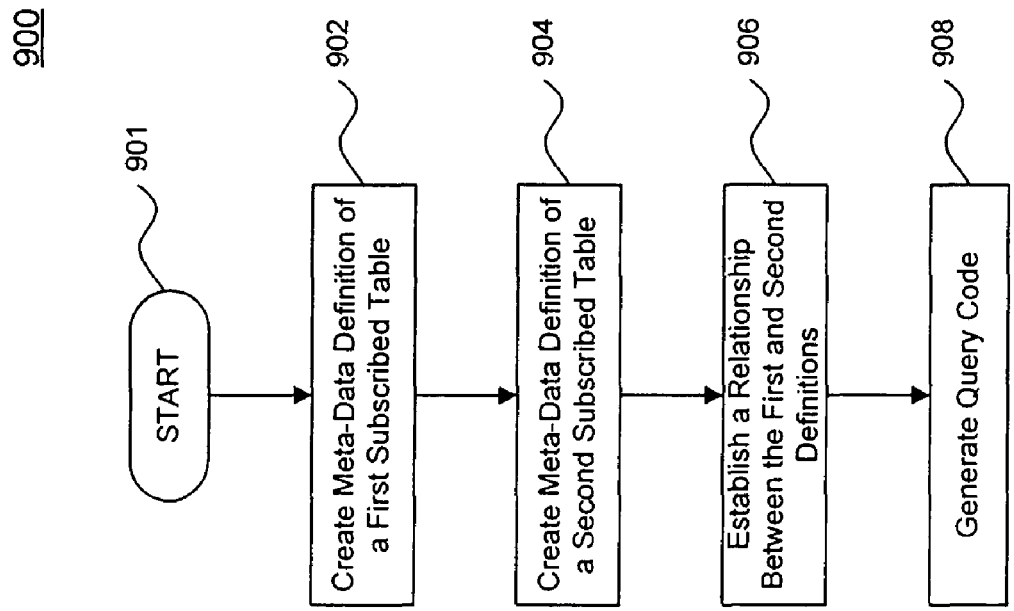
FIG. 9 is a flowchart illustrating steps by which a data subscription is associated with another data subscription, in accordance with an embodiment of the present invention.

FIG. 9 is a flowchart 900 illustrating the steps by which entity relationships are established and modeled, in accordance with an embodiment of the present invention. The method begins at step 901, and proceeds to step 902 where a meta-data definition of a first table is created. At step 904, a meta-data definition of a second table is created, and a relationship between the two definitions is established at step 906. Finally, query code is generated at step 908 in a manner consistent with the relationship.

In accordance with an embodiment of the present invention, a relationship between a "customer" and one or more "orders" is established as follows:

```
<entity name="Customer" id="id">
    <attribute name="id" type="int" />
    <attribute name="name" type="string" />
    <attribute name="orders" type="Order*"
        inverse="Order.customer" />
</entity>
<entity name="Order" id="id">
    <attribute name="id" type="int" />
    <attribute name="customer" type="Customer"
        inverse="Customer.orders" />
    <attribute name="orderLines" type="OrderLine*"
        inverse="OrderLine.order" />
</entity>
```

In the above example, a first and second meta-data definition, as in steps 902 and 904, are created by defining the "Customer" and "Order" entities. A relationship is established between the two entities, as in step 906, through the use of an association attribute, such as the association between the attribute "orders" in the "Customers" entity with an array of "Order" entities in the above example.

In accordance with an embodiment of the present invention, the association defines an implicit query. By subscribing to this query, as with any explicit or implicit query previously discussed, it is possible to enable a local database 204 to obtain copies of the query results from a central database 202.

Implicit queries were previously discussed in Section II with the placement of a <subscribe-on-demand> tag between <entity> tags in order to enable a subscription to a query implied for any entity. In a similar manner, a subscription to a query implied by an association is defined with the placement of a <subscribe-on-demand> tag between <attribute> tags, in accordance with an embodiment of the present invention. For example, in accordance with an embodiment of the present invention, the tags are used as follows:

```
<attribute name="orders" type="Order*" inverse="Order.customer">
    <subscribe-on-demand />
</attribute>
```

One skilled in the relevant arts will appreciate that the schema used in the meta-data definitions shown here is only used by way of example, and not limitation, and that any appropriate schema may be used to define a subscription to the relevant query.

At step 908, a query is generated for the implicit query defined by the relationship, and this query can be utilized in the creation of a download cursor for a subscribed query, as discussed in Section IV. For example, the query generated for the example "orders" attribute for the "Customer" entity above, in accordance with an embodiment of the present invention, is as follows:

```
<query name="getOrders">
    <parameter name="id" type="int" />
    <sql>
        select o from Order o where o.customer = :id
    </sql>
</query>
```

It should be noted that an equivalent query can be generated by, as before, explicitly defining a "getOrders" query. However, in accordance with an embodiment of the present invention, the definition of a relationship between two entities as shown in flowchart 900 creates this implicit query which can create coding efficiencies.

VIII. Intelligent Prefetch with Multiple Devices

Referring back to FIG. 3, as previously discussed in Section I, it is possible for multiple mobile devices, such as mobile devices 304A-304C, to be associated with a particular user, such as User A 302A. A user need not be an individual, but may also be a group of individuals, such as a team, division, or corporation, in accordance with an embodiment of the present invention.

Figure 10:
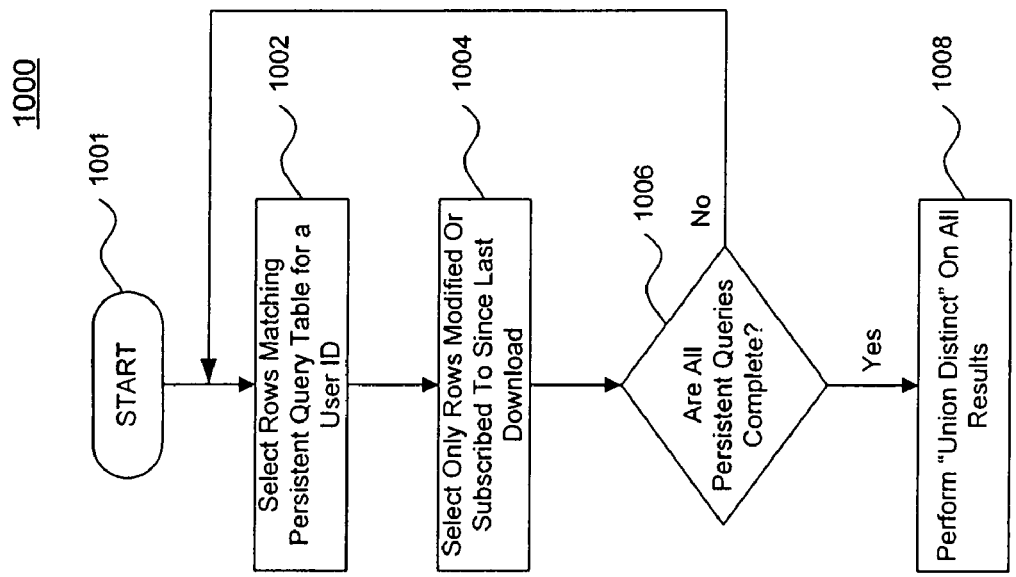
FIG. 10 is a flowchart illustrating steps by which data is accessed by a mobile device associated with a user, in accordance with an embodiment of the present invention.

Turning to FIG. 10, flowchart 1000 illustrates a method by which subscriptions can be optimized for multiple devices controlled by a single user. In accordance with an embodiment of the present invention, a user is able to move between devices and, with at most a single synchronization, be confident that the data available at the current mobile device includes any data the user was recently working with.

The method starts at step 1001 and proceeds to step 1002, where rows queried from central database 202 are selected so that they match the persistent query table. This is similar to the process described in Section IV for generating a typical download cursor, except instead of matching entries from the persistent query table for a particular mobile device (e.g., "where pq.remote_id={ml s.remote_id}"), the entries are checked for a match to a user ID (e.g., "where pq.user_id={ml s.username}"), in accordance with an embodiment of the present invention.

In accordance with an embodiment of the present invention, individual queries can be marked for user-level subscription rather than device-level subscription. This is accomplished, in accordance with an additional embodiment of the present invention, by extending the <subscribe-on-demand> tab to include a "by-user-id" parameter, such as:

<subscribe-on-demand by-user-id="true"/>

As before, one skilled in the relevant arts will appreciate that the particular schema used is illustrative, and should not be interpreted as limiting. A user-level subscription can be made, as with any other subscription, on either implicit or explicit queries. In accordance with a further embodiment of the present invention, all query subscriptions can be implicitly deemed to be user-level subscriptions rather than device-level subscriptions, rather than using a parameter such as "by-user-id".

The method proceeds to steps 1004, 1006, and 1008, which are otherwise similar to steps 604, 606, and 608 in FIG. 6, respectively. These steps are described in detail in Section IV.

IX. Intelligent Prefetch with Inherited Subscriptions

Sometimes it becomes known, perhaps by virtue of optimization testing on an application performing queries on a database, that when a query is performed on a particular data set, a query on a second data set is likely to follow. In the case of a configuration where local database 204 only has a subset of the data available in central database 204, performance benefits may be realized by retrieving not only data related to the first query, but also the second query, and storing this data in local database 204.

In accordance with an embodiment of the present invention, the inheritance can be recognized and implemented manually, using the previously discussed techniques. For example, suppose that whenever a mobile device 104 has retrieved information about an "Order" into its local database 204, there is a high probability that it will also require information about "OrderLines" associated with each "Order." By applying the techniques disclosed in Section VII, the "Order.orderLines" attribute is marked with a <subscribe-on-demand> tag to create the subscription. This creates a separate persistent query table for this query, which increases the number of persistent query rows that must be propagated and managed between a mobile device and a server system.

Figure 11:
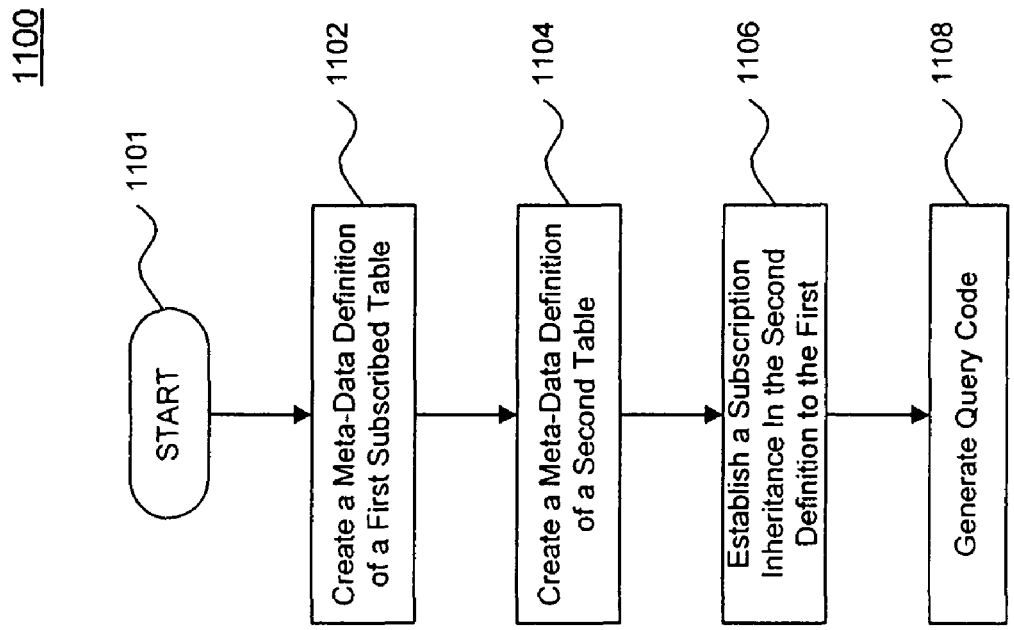
FIG. 11 is a flowchart illustrating steps by which a data subscription is inherited from another data subscription, in accordance with an embodiment of the present invention.

An additional means of performing this optimization, without the need for additional persistent query rows, is through the use of inherited subscriptions. FIG. 11 is a flowchart 1100, illustrating the steps by which an inherited subscription is defined and used. The method starts at step 1101 and proceeds to step 1102, where a traditional meta-data definition (i.e., entity) for a data table is created. Within this definition, at least one of the queries is marked for subscription.

At step 1104, a second meta-data definition is created, this time without any particular subscription definition. Instead, at step 1106, an inheritance subscription is defined, in accordance with an embodiment of the present invention. This is accomplished, in an example schema, as follows:

```
<entity name="OrderLine" id="id">
    <subscribe-on-demand>
        <inherit-from-parent="order" />
    </subscribe-on-demand>
    <attribute name="id" type="int" />
    <attribute name="order" type="Order"
        inverse="Order.orders" />
    <attribute name="product" type="Product" />
    <attribute name="quantity" type="int" />
</entity>
```

At step 1108, query code is generated for the subscribed query. In accordance with an embodiment of the present invention, a download cursor for a child entity is modified so that the query results are joined with the persistent query table for the child's parent entity. For example, the query code generated for the above entity would be as follows, in accordance with an embodiment of the present invention:

```
select ol.id, ol.order, ol..product, ol.quantity
    from OrderLine ol, Order o, Order__pq pq
    where pq.remote__id = {ml s.remote__id}
    and pq.id__param = o.id
    and (o.last__modified >= {ml s.last__table__download}
        or pq.last__modified >= {ml s.last__table__download})
    and ol.order = o.id
```

It should further be noted that the above example query also provides for a modification date check, and accordingly the "Order.last_modified" column should be changed whenever any order lines for the order are inserted, deleted, or updated.

In accordance with an embodiment of the present invention, this is accomplished through the use of triggers in the central database.

In accordance with an additional embodiment of the present invention, if a child entity's parent is not marked as having a subscription, but the child entity's grandparent does have a subscription, then the download cursor for the child entity is modified so that the query results are joined with the persistent query table for the child's grandparent entity. For example, the query code generated for the above entity, where the parent entity does not have a subscription, but the grandparent entity does, would be as follows, in accordance with an embodiment of the present invention:

```
select ol.id, ol.order, ol..product, ol.quantity
    from OrderLine ol, Order o, Customer c, Customer_pq pq
    where pq.remote_id = {ml s.remote_id}
        and pq.id_param = c.id
        and (c.last_modified >= {ml s.last_table_download}
            or pq.last_modified >= {ml s.last_table_download})
        and ol.customer = c.id
```

In order to obtain this query code, the above-referenced meta data is modified such that <inherit-from-parent="order"/> instead reads <inherit-from-parent="order.customer"/>, in accordance with an embodiment of the present invention.

It should further be noted that the above example query also provides for a modification date check, and accordingly the "Order.last_modified" column should be changed whenever any order lines for the order are inserted, deleted, or updated. In accordance with an embodiment of the present invention, this is accomplished through the use of triggers in the central database.

X. Intelligent Prefetch with Cascading Subscriptions

A mobile device, such as mobile device 104, is usually capable of running multiple applications, often simultaneously. Each of these applications may access, either in turn or simultaneously, local database 204. As each application may serve a different purpose, the optimization needs for each application may vary. The optimization needs may include, for example, precisely what data each application needs to retrieve from central database 202 into local database 204 during a synchronization.

One solution is to meet the demands of the application which requires the most subscriptions, subscribing to the union of all queries required by either application. This solution may work for a mobile device with sufficient memory capabilities, but it would not work for any situation where there are size constraints on local database 204. Additionally, the creation and synchronization of persistent queries which are unneeded by one of the applications creates further inefficiencies.

If, instead, only the subscription demands of the application requiring the fewest subscriptions is met, then the other application may require multiple synchronization steps to obtain all of the data it requires.

Figure 12:
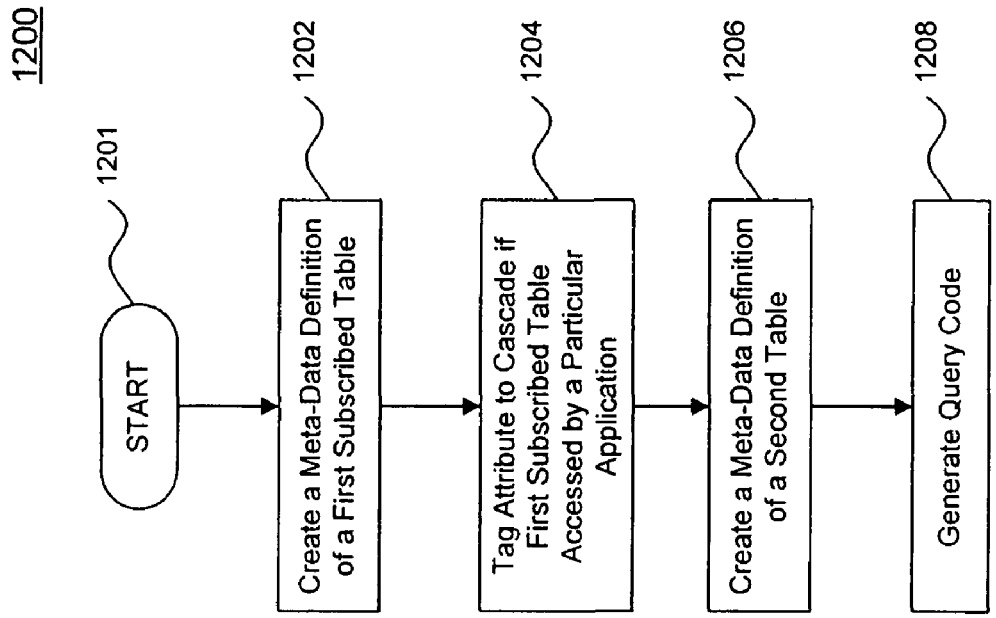
FIG. 12 is a flowchart illustrating steps by which a data subscription can be associated with an application, in accordance with an embodiment of the present invention.

FIG. 12 is a flowchart 1200 illustrating steps by which subscriptions can be defined in a cascading manner for multiple applications. The method starts at step 1201 and proceeds to step 1202 where a meta-data definition of a first table is created. At step 1204, a subscription is made to a query in the first table, including a reference to a cascading subscription and the current application. In accordance with an embodiment of the present invention, the reference to the cascading subscription is made to an attribute defining an entity relationship, as described in Section VII.

At step 1206, a meta-data definition of a second table is made, and at step 1208 the relevant query code is generated.

Step 1202 defines the first subscribed table as an entity having a relationship to the second table (defined in step 1206), as detailed in Section VII. Step 1204 defines the cascading relationship. In accordance with an embodiment of the present invention, the cascading relationship triggers a subscription to the entity in the cascaded-to attribute when a query is made by a specific application. An example meta-data definition, in accordance with an embodiment of the present invention, is as follows:

```
<entity name="Customer" id="id">
    <subscribe-on-demand>
        <cascade-to-attribute="orders" if-application="appB" />
    </subscribe-on-demand>
    <attribute name="id" type="int" />
    <attribute name="name" type="string" />
    <attribute name="orders" type="Order*"
        inverse="Order.customer">
        <subscribe-on-demand />
    </attribute>
</entity>
```

In the above example, if an application named "appB" attempts to perform the implicit query defined for entity "Customer," a persistent query is generated for the implicit query as well as the "Customer.getOrders( )" query, in accordance with an embodiment of the present invention. It should be noted that a subscription to the "getorders" query can still be defined separately, such that any application performing the "getOrders" query will be subscribed to it even if the implicit query for "Customer" has not first been performed.

Figure 13:
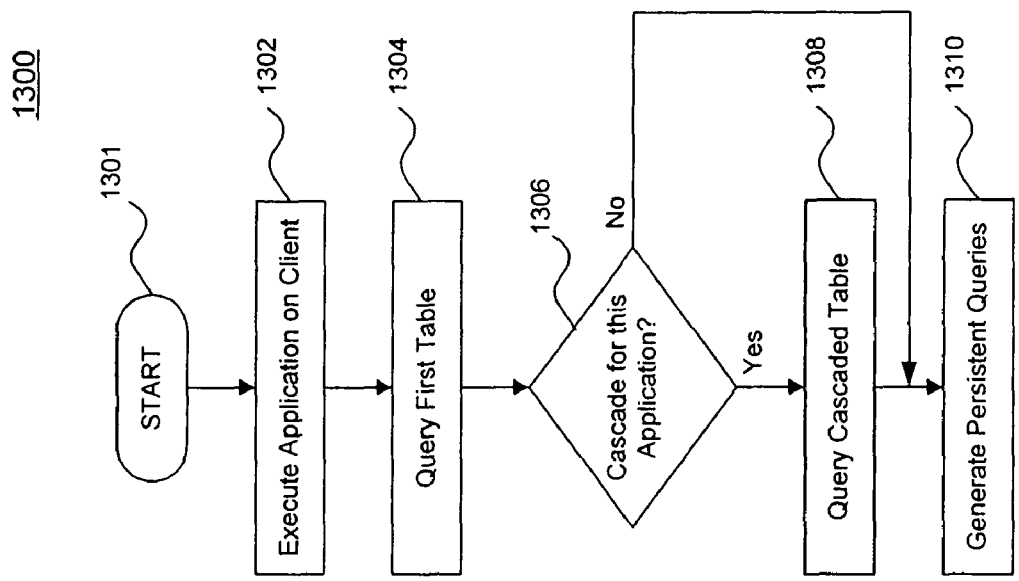
FIG. 13 is a flowchart illustrating steps by which a data subscription associated with an application is recognized, in accordance with an embodiment of the present invention.

In accordance with an additional embodiment of the present invention, the query is implemented by modifying the code used to create persistent query rows to also include the cascaded-to query if the expected application is performing the query. FIG. 13 is a flowchart 1300 illustrating the steps by which the modified code is processed, in accordance with an embodiment of the present invention. The method begins at step 1301 and proceeds to step 1302 where an application is executed on a client, such as mobile device 104. At step 1304, a first table is queried. If a persistent query does not already exist for this table, then it is created. At step 1306, a determination is made as to whether additional persistent queries are necessary due to cascading. Specifically, if the first query has a defined cascading operation, then step 1306 further checks to see whether the present application is one of the applications for which the cascading operation is defined. If so, then the method proceeds to step 1308, where the cascaded-to table is queried. The method then proceeds to step 1310, where the persistent queries for one or both tables, as necessary, are created.

Although the tag "cascade-to-attribute" and option "if-application" are shown in the above example, one skilled in the relevant arts will recognize that any schema may be utilized in order to define the cascading relationship, as well as which application or applications the cascading relationship applies to.

In accordance with an additional embodiment of the present invention, a process of query prediction is implemented in order to provide cascade-to advice. Cascade-to advice alerts a user or process creating meta-data definitions of tables of possibly beneficial uses of the cascading functionality. The query prediction is performed, in accordance with an embodiment of the present invention, by analyzing a compiled application (e.g., Java bytecode or Microsoft .NET IL) to produce the cascade-to advice. Moreover, if cascading has been manually configured, the query prediction is able to alert of possible situations where cascading may not be required, in accordance with an additional embodiment of the present invention.

In accordance with an embodiment of the present invention, cascading can be extended by removing the need to define an application for the cascading operation. This situation represents an unconditional cascading operation.

In accordance with an additional embodiment of the present invention, cascading can be extended to include an "if-transaction" restriction. When an application runtime environment allows the specification of named transactions, or provides an API for developers to assign a name to a currently running transaction, cascading can be supported for that specific transaction instead of the complete application using an "if-transaction" restriction.

In accordance with another embodiment of the present invention, cascading can be extended to include an "if-context" restriction. An API is provided for a developer to indicate a name for a current execution context, and cascading is tied into the execution context.

In accordance with a further embodiment of the present invention, cascading is used with a query rather than an attribute. In the above cascading example, an entity relationship defined by an attribute is used to establish the cascading relationship. In the present embodiment, it is possible to define an explicit query and define a cascading relationship to that query. The above example would be rewritten, under the present embodiment, such that the meta-data could be defined as follows:

```
<entity name="Customer" id="id">
    <subscribe-on-demand>
        <cascade-to-query="Order.findByCustomer(id)" />
    </subscribe-on-demand>
    <attribute name="id" type="int" />
    <attribute name="name" type="string" />
</entity>
<entity name="Order" id="id">
    <attribute name="id" type="int" />
    <query name="findByCustomer">
        <subscribe-on-demand />
        <parameter name="id" type="int" />
        <sql> ... </sql>
    </query>
</entity>
```

One skilled in the relevant arts will appreciate that any number of optimizations can be combined or used individually, and that particular implementations are shown by way of example and not limitation.

XI. Example Computer System Implementation

Figure 14:
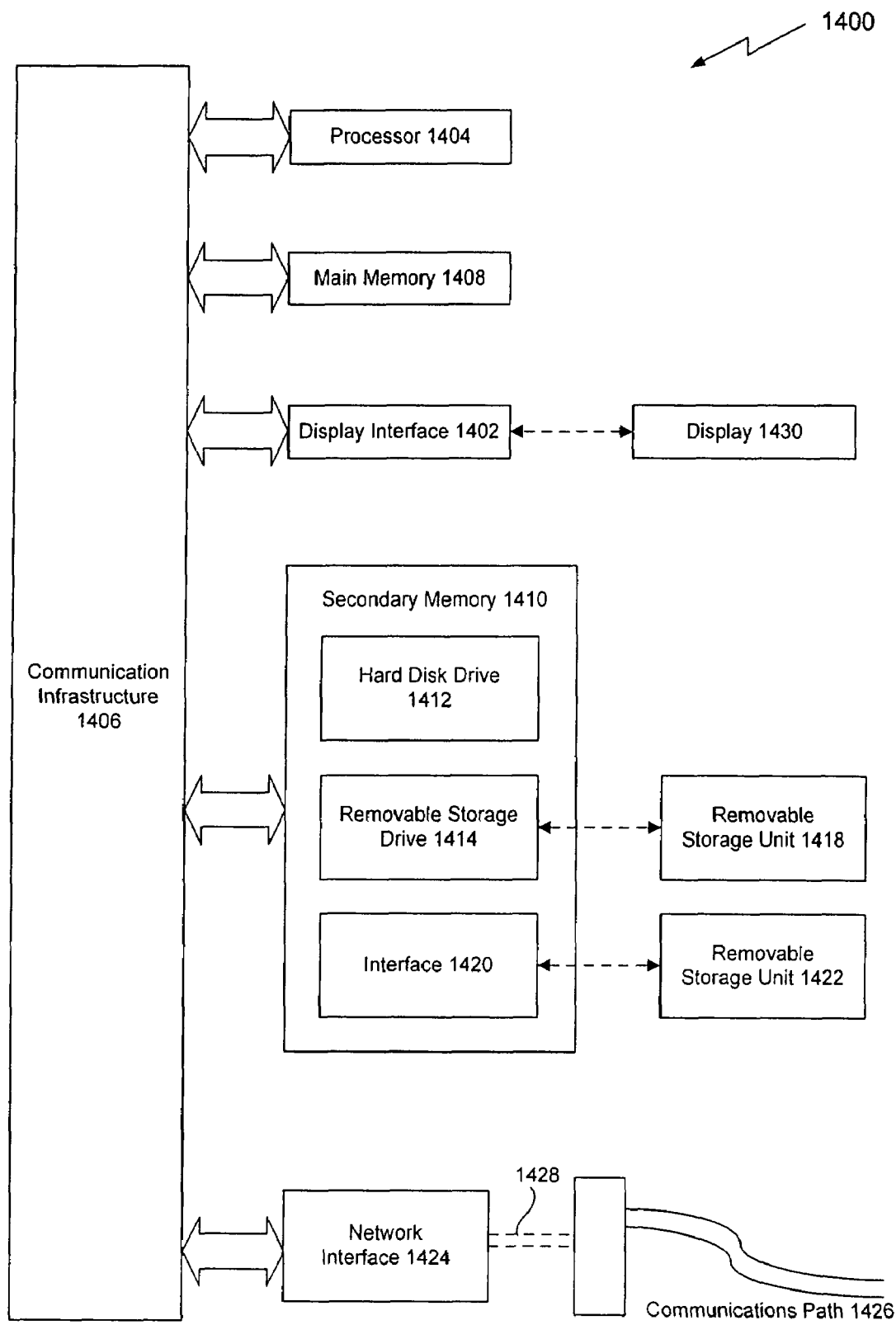
FIG. 14 depicts an example computer system in which the present invention may be implemented.

Various aspects of the present invention can be implemented by software, firmware, hardware, or a combination thereof. FIG. 14 illustrates an example computer system 1400 in which the present invention, or portions thereof, can be implemented as computer-readable code. For example, the methods illustrated by flowcharts 400 of FIG. 4, 500 of FIG. 5, 600 of FIG. 6, 700 of FIG. 7, 800 of FIG. 8, 900 of FIG. 9, 1000 of FIG. 10, 1100 of FIG. 11, 1200 of FIG. 12, and 1300 of FIG. 13 can be implemented in system 1400. Various embodiments of the invention are described in terms of this example computer system 1400. After reading this description, it will become apparent to a person skilled in the relevant art how to implement the invention using other computer systems and/or computer architectures.

Computer system 1400 includes one or more processors, such as processor 1404. Processor 1404 can be a special purpose or a general purpose processor. Processor 1404 is connected to a communication infrastructure 1406 (for example, a bus or network).

Computer system 1400 also includes a main memory 1408, preferably random access memory (RAM), and may also include a secondary memory 1410. Secondary memory 1410 may include, for example, a hard disk drive 1412, a removable storage drive 1414, and/or a memory stick. Removable storage drive 1414 may comprise a floppy disk drive, a magnetic tape drive, an optical disk drive, a flash memory, or the like. The removable storage drive 1414 reads from and/or writes to a removable storage unit 1418 in a well known manner. Removable storage unit 1418 may comprise a floppy disk, magnetic tape, optical disk, etc. which is read by and written to by removable storage drive 1414. As will be appreciated by persons skilled in the relevant art(s), removable storage unit 1418 includes a computer usable storage medium having stored therein computer software and/or data.

In alternative implementations, secondary memory 1410 may include other similar means for allowing computer programs or other instructions to be loaded into computer system 1400. Such means may include, for example, a removable storage unit 1422 and an interface 1420. Examples of such means may include a program cartridge and cartridge interface (such as that found in video game devices), a removable memory chip (such as an EPROM, or PROM) and associated socket, and other removable storage units 1422 and interfaces 1420 which allow software and data to be transferred from the removable storage unit 1422 to computer system 1400.

Computer system 1400 may also include a communications interface 1424. Communications interface 1424 allows software and data to be transferred between computer system 1400 and external devices. Communications interface 1424 may include a modem, a network interface (such as an Ethernet card), a communications port, a PCMCIA slot and card, or the like. Software and data transferred via communications interface 1424 are in the form of signals which may be electronic, electromagnetic, optical, or other signals capable of being received by communications interface 1424. These signals are provided to communications interface 1424 via a communications path 1426. Communications path 1426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1418, removable storage unit 1422, and a hard disk installed in hard disk drive 1412. Signals carried over communications path 1426 can also embody the logic described herein. Computer program medium and computer usable medium can also refer to memories, such as main memory 1408 and secondary memory 1410, which can be memory semiconductors (e.g. DRAMs, etc.). These computer program products are means for providing software to computer system 1400.

Computer programs (also called computer control logic) are stored in main memory 1408 and/or secondary memory 1410. Computer programs may also be received via communications interface 1424. Such computer programs, when executed, enable computer system 1400 to implement the present invention as discussed herein. In particular, the computer programs, when executed, enable processor 1404 to implement the processes of the present invention, such as the steps in the methods illustrated by flowcharts 400 of FIG. 4, 500 of FIG. 5, 600 of FIG. 6, 700 of FIG. 7, 800 of FIG. 8, 900 of FIG. 9, 1000 of FIG. 10, 1100 of FIG. 11, 1200 of FIG. 12, and 1300 of FIG. 13 discussed above. Accordingly, such computer programs represent controllers of the computer system 1400. Where the invention is implemented using software, the software may be stored in a computer program product and loaded into computer system 1400 using removable storage drive 1414, interface 1420, hard drive 1412 or communications interface 1424.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

XII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for creating a data subscription to a remote database, comprising:

marking a query to be performed on a table located within the remote database as persistent within a meta-data definition of the query, indicating that results for the query are persisted to a local database;

generating, in a processor, a persistent query entity based on the meta-data definition, wherein the persistent query entity is mapped to a persistent query table in the local database, each row of the persistent query table representing an invocation of the query with a particular set of parameters;

uploading the persistent query table to the remote database to create a subscription for the query corresponding to the particular set of parameters; and generating query execution code to:

consult the persistent query table to determine if the result of an instance of the persistent query is contained in the local database, consult the local database if the result of the instance of the persistent query is contained in the local database, and create an entry in the persistent query table if the result of the instance of the persistent query is not contained in the local database.

2. The method of claim 1, wherein the query is implicitly defined by the meta-data definition.

3. The method of claim 1, wherein the query is explicitly defined by the meta-data definition.

4. The method of claim 1, wherein uploading the persistent query table comprises: generating an upload cursor to upload the persistent query table to the remote database.

5. The method of claim 1, further comprising: generating a download cursor.

6. The method of claim 5, wherein the step of generating a download cursor comprises: generating a query, the query operable to obtain entries from the table that correspond to entries in the persistent query table.

7. The method of claim 1, further comprising: distributing a row from the persistent query table to a second local database.

8. The method of claim 1, further comprising: mapping a second persistent query entity to the persistent query table responsive to the mapping of the persistent query entity to the persistent query table.

9. The method of claim 8, wherein the mapping of the second persistent query entity is performed if an application issuing the query requires use of the second persistent query entity.

10. A computer-readable storage medium having instructions stored thereon that, when executed by a computing device, cause a processor to perform a method for creating a data subscription to a remote database, the method comprising:

marking a query to be performed on a table located within the remote database as persistent within a meta-data definition of the query, indicating that results for the query are persisted to a local database;

generating a persistent query entity based on the meta-data definition, wherein the persistent query entity is mapped to a persistent query table in the local database, each row of the persistent query table representing an invocation of the query with a particular set of parameters;

uploading the persistent query table to the remote database to create a subscription for the query corresponding to the particular set of parameters; and generating query execution code to:

consult the persistent query table to determine if the result of an instance of the persistent query is contained in the local database, consult the local database if the result of the instance of the persistent query is contained in the local database, and create an entry in the persistent query table if the result of the instance of the persistent query is not contained in the local database.

11. A system capable of creating a data subscription to a remote database, comprising:

a memory configured to store:

a marking module configured to mark a query to be performed on a table located within the remote database as persistent within a meta-data definition of the query, indicating that results for the query are persisted to a local database;

a generating module configured to generate a persistent query entity based on the meta-data definition, wherein the persistent query entity is mapped to a persistent query table in the local database, each row of the persistent query table representing an invocation of the query with a particular set of parameters;

an uploading module configured to upload the persistent query table to the remote database to create a subscription for the query corresponding to the particular set of parameters; and a generating module configured to generate query execution code to:

consult the persistent query table to determine if the result of an instance of the persistent query is contained in the local database, consult the local database if the result of the instance of the persistent query is contained in the local database, and create an entry in the persistent query table if the result of the instance of the persistent query is not contained in the local database; and one or more processors configured to process the modules.

12. A computer-implemented method for creating a persistent query, wherein a table in a remote database is represented by a meta-data definition, comprising:

identifying, in the definition, a query to be performed on the table, wherein the query has been marked as a subscribed query;

defining a persistent query entity for the subscribed query, indicating that results for the subscribed query are persisted to a local database;

mapping the persistent query entity to a persistent query table, each row of the persistent query table representing an invocation of the subscribed query with a particular set of parameters;

uploading the persistent query table to the remote database to create a subscription for the subscribed query corresponding to the particular set of parameters; and generating query code to:

consult the persistent query table to determine if the result of an instance of the persistent query is contained in the local database, consult the local database if the result of the instance of the persistent query is contained in the local database, and create an entry in the persistent query table if the result of the instance of the persistent query is not contained in the local database.

13. The method of claim 12, further comprising: generating an upload cursor to upload the persistent query table to the remote database.

14. The method of claim 12, further comprising: receiving an instance of the subscribed query; and consulting the persistent query table to determine if a result of the instance of the subscribed query is contained in the local database.

15. The method of claim 14, wherein the result of the instance of the subscribed query is contained in the local database, further comprising: retrieving the result from a copy of the table in the local database.

16. The method of claim 14, further comprising: synchronizing the local database with the remote database.

17. The method of claim 16, wherein the step of synchronizing the local database with the remote database comprises: selecting rows from the remote database by joining the table with the persistent query table; and downloading the selected rows to the local database.

18. The method of claim 17, wherein the set of selected rows consist of only rows modified or subscribed to since the last synchronization.

19. The method of claim 17, wherein the steps of selecting rows and downloading the selected rows are implemented in a download cursor.

20. The method of claim 17, wherein the step of downloading the selected rows to the local database creates a copy of the table in the local database.

21. The method of claim 14, wherein the result of the instance of the subscribed query is not contained in the local database, further comprising: creating an entry in the persistent query table corresponding to the instance of the subscribed query.

22. The method of claim 12, further comprising: distributing a row from the persistent query table to a second local database.

23. The method of claim 12, further comprising: mapping a second persistent query entity to the persistent query table responsive to the mapping of the persistent query entity to the persistent query table.

24. The method of claim 23, wherein the mapping of the second persistent query entity is performed if an application issuing the query requires use of the second persistent query entity.

25. A computer-readable storage medium having instructions stored thereon that, when executed by a computing device, cause a processor to perform a method for creating a persistent query, wherein a table in a remote database is represented by a meta-data definition, the method comprising:

identifying, in the definition, a query to be performed on the table, wherein the query has been marked as a subscribed query;

defining a persistent query entity for the subscribed query, indicating that results for the subscribed query are persisted to a local database;

mapping the persistent query entity to a persistent query table, each row of the persistent query table representing an invocation of the subscribed query with a particular set of parameters;

uploading the persistent query table to the remote database to create a subscription for the subscribed query corresponding to the particular set of parameters; and generating query code to:

consult the persistent query table to determine if the result of an instance of the persistent query is contained in the local database, consult the local database if the result of the instance of the persistent query is contained in the local database, and create an entry in the persistent query table if the result of the instance of the persistent query is not contained in the local database.

26. A system capable of creating a persistent query, wherein a table in a remote database is represented by a meta-data definition, comprising:

a memory configured to store:

an identifying module configured to identify, in the definition, a query to be performed on the table, wherein the query has been marked as a subscribed query;

a defining module configured to define a persistent query entity for the subscribed query, indicating that results for the subscribed query are persisted to a local database;

a mapping module configured to map the persistent query entity to a persistent query table, each row of the persistent query table representing an invocation of the subscribed query with a particular set of parameters;

an uploading module configured to upload the persistent query table to the remote database to create a subscription for the subscribed query corresponding to the particular set of parameters; and a generating module configured to generate query code to:

consult the persistent query table to determine if the result of an instance of the persistent query is contained in the local database, consult the local database if the result of the instance of the persistent query is contained in the local database, and create an entry in the persistent query table if the result of the instance of the persistent query is not contained in the local database; and one or more processors configured to process the modules.

\* \* \* \* \*